(12) United States Patent
Park et al.

(10) Patent No.: US 9,686,567 B2
(45) Date of Patent: Jun. 20, 2017

(54) METHOD AND APPARATUS FOR INTEGRATED ENCODING/DECODING OF DIFFERENT MULTILAYER VIDEO CODEC

(71) Applicant: University-Industry Cooperation Group of Kyung Hee University, Yongin-si (KR)

(72) Inventors: Gwang Hoon Park, Seongnam-si (KR); Kyung Yong Kim, Suwon-si (KR); Young Su Heo, Suwon-si (KR); Yoon Jin Lee, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 327 days.

(21) Appl. No.: 14/391,429

(22) PCT Filed: Jul. 10, 2014

(86) PCT No.: PCT/KR2014/006211
§ 371 (c)(1),
(2) Date: Oct. 9, 2014

(87) PCT Pub. No.: WO2015/012514
PCT Pub. Date: Jan. 29, 2015

(65) Prior Publication Data
US 2016/0295239 A1  Oct. 6, 2016

(30) Foreign Application Priority Data

Jul. 26, 2013 (KR) .................. 10-2013-0089087
Jun. 10, 2014 (KR) .................. 10-2014-0070006

(51) Int. Cl.
H04N 19/00    (2014.01)
H04N 19/597   (2014.01)
H04N 19/30    (2014.01)

(52) U.S. Cl.
CPC .......... *H04N 19/597* (2014.11); *H04N 19/30* (2014.11)

(58) Field of Classification Search
CPC ........................ H04N 19/597; H04N 19/30
(Continued)

(56) References Cited

U.S. PATENT DOCUMENTS

2007/0150271 A1  6/2007  Virette et al.
2010/0165077 A1  7/2010  Yin et al.
(Continued)

FOREIGN PATENT DOCUMENTS

KR  10-2004-0063597 A  7/2004
KR  10-2005-0049965 A  5/2005
KR  10-2009-0037252 A  4/2009

OTHER PUBLICATIONS

International Search Report issued by the International Search Authority on Oct. 14, 2014 in the corresponding PCT Application No. PCT/KR2014/006211 (3 Pages).

*Primary Examiner* — Jeffery Williams
(74) *Attorney, Agent, or Firm* — NSIP Law

(57) ABSTRACT

The present invention relates to an integrated video encoder/decoder supporting multilayer pictures with different types. The integrated video encoder according to the present invention includes a base encoder including an encoding algorithm module to encode a base-layer picture among multilayer pictures; and a partial encoder including an additional encoding algorithm module to encode an enhancement-layer picture based on a video coding type of the multilayer pictures.

9 Claims, 15 Drawing Sheets

(58) Field of Classification Search
USPC .................................................. 375/240.02
See application file for complete search history.

(56) References Cited

U.S. PATENT DOCUMENTS

2013/0314495 A1* 11/2013 Chen .................. H04N 13/0048
348/43
2014/0010294 A1* 1/2014 Ye .................... H04N 19/00424
375/240.12

* cited by examiner (PRIOR ART)

(PRIOR ART)

METHOD AND APPARATUS FOR INTEGRATED ENCODING/DECODING OF DIFFERENT MULTILAYER VIDEO CODEC

CROSS-REFERENCE TO RELATED APPLICATIONS

This application is a National Stage of International Application No. PCT/KR2014/006211, filed Jul. 10, 2014 and published as WO 2015/012514 on Jan. 29, 2015, which claims the benefit under 35 USC §119(a) of Korean Patent Application No. 10-2013-0089087, filed on Jul. 26, 2013, and Korean Patent Application No. 10-2014-0070006, filed on Jun. 10, 2014, the entire disclosures of which are incorporated herein by reference for all purposes.

TECHNICAL FIELD

The present invention relates to methods and apparatuses for integrated-encoding/decoding different multilayer video codices sharing base encoding/decoding algorithms, and more particularly, to a method for reducing hardware or software implementation complexity when different multilayer video codices are integrated.

BACKGROUND ART

Multilayer pictures include a scalable video picture supporting scalability, a multi-view video picture supporting pictures from a plurality of viewpoints, a stereoscopic three-dimensional (3D) video picture, or the like, and encoding/decoding techniques using these multilayer pictures include scalable video coding, 3D video coding, or the like. The Joint Collaborative Team on Video Coding Extension Development (JCT-VC) are conducting studies on scalable video coding standards (for example, SHVC), while the Joint Collaborative Team on 3D Video Coding Extension Development (JCT-3V) are conducting studies on 3D video coding standards (for example, 3D-HEVC). The JCT-VC and JCT-3V are a group of video coding experts from the ITU-T Study Group 16 Visual Coding Experts Group (VCEG) and the ISO/IEC JTC 1/SC 29/WG 11 Moving Picture Experts Group (MPEG).

Scalable video standards include standards for advanced data formats and relevant technologies which enable users to watch base-layer video and enhancement-layer video with enhanced picture quality, image size or frame rate from the base-layer video to be suitable for various transmission and reproduction environments using scalability.

FIG. 1 illustrates a basic scalable video coding system considered in scalable video standards.

A transmitter side acquires picture contents having scalable information by downsampling an input picture. The acquired picture contents may include temporal, spatial and quality (signal-to-noise ratio (SNR)) scalability information on the picture. The picture contents is compressed by a scalable encoder using a scalable video encoding method, and a compressed bit stream is transmitted to a terminal through a network.

A receiver side decodes the transmitted bit stream by a scalable decoder using a scalable video decoding method to reconstruct a picture suitable for a user environment.

3D video standards include standards for advanced data formats and relevant technologies which support representation of not only stereoscopic images but also multi-view images input from a plurality of camera using real images and depth maps thereof.

FIG. 2 illustrates a basic 3D video system considered in 3D video standards.

A transmitter side acquires N-view (N≥2) picture contents using a stereo camera, a depth camera, a multi-view camera and a converter of converting a 2D picture into a 3D picture. The acquired picture contents may include N-view video information, depth map information thereof and side information related cameras. The N-view picture contents are compressed by a 3DV encoder using a multi-view video encoding method, and a compressed bit stream is transmitted to a terminal through a network.

A receiver side decodes the transmitted bit stream by a 3DV decoder using a multi-view video decoding method to reconstruct N-view pictures. The virtual-view pictures of N views or greater can be generated from the reconstructed N-view pictures by depth-image-based rendering (DIBR). The virtual-view pictures of the N views or greater are reproduced suitably for various 3D display apparatuses to provide pictures having 3D effect to users.

FIG. 3 illustrates an encoder/decoder supporting multilayer pictures used for scalable video coding of FIG. 1 or multi-view video coding of FIG. 2 according to an embodiment.

Referring to FIG. 3, the base layer may be independently encoded/decoded, and the enhancement layer may be encoded/decoded using encoded information on the base layer. Further, layers may be encoded/decoded dependently on each other using correlation information between the layers.

DISCLOSURE

Technical Problem

An aspect of the present invention is to provide methods and apparatuses for integrated-encoding/decoding different multilayer video codices which increase reusability of conventional encoding/decoding modules when integrating multilayer video codices.

Another aspect of the present invention is to provide a method of configuring single integrated hardware by reusing the same base-layer encoding module already configured as a hardware chip and just applying an additional encoding algorithm depending on a video codec type in configuring different enhancement-layer encoding modules for three-dimensional (3D) video coding and scalable video coding when three or more different video codices having the same base-layer encoding algorithm (that is, three or more video codices with different purposes, for example, a base codec and codices relating to 3D video and scalable video) are integrated.

Technical Solution

According to an embodiment of the present invention, there is provided an integrated video encoder supporting multilayer pictures with different types. The integrated video encoder includes a base encoder including an encoding algorithm module to encode a base-layer picture among multilayer pictures and partial encoders including additional encoding algorithm modules to encode enhancement-layer pictures based on a video coding type of the multilayer pictures.

The multilayer pictures may include a scalable picture supporting at least one of view, temporal and quality scalabilities or a three-dimensional (3D) video picture including general pictures and depth map pictures from each viewpoint.

According to another embodiment of the present invention, there is provided an integrated video decoder supporting multilayer pictures with different types. The integrated video decoder includes a base decoder including a decoding algorithm module to decode a base-layer picture among multilayer pictures and partial decoders including additional decoding algorithm modules to decode enhancement-layer pictures based on a video coding type of the multilayer pictures.

The multilayer pictures may include a scalable picture supporting at least one of view, temporal and quality scalabilities or a 3D video picture including general pictures and depth map pictures from each viewpoint.

Advantageous Effects

The present invention may use the same conventional video encoding and decoding modules when configuring different multilayer video codices into an integrated codec, thereby reducing implementation complexity of an integrated encoding and decoding method and apparatus.

Also, the present invention realizes single integrated hardware by reusing the same base-layer encoding module already configured as a hardware chip and just applying an additional encoding algorithm depending on a video codec type in configuring different enhancement-layer encoding modules for three-dimensional (3D) video coding and scalable video coding when configuring an integrated codec by combining a base codec having a base encoding algorithm and codices relating to 3D video and scalable video which have functions of the base codec, that is, three or more video codices with different purposes.

MODE FOR INVENTION

Figure 1:
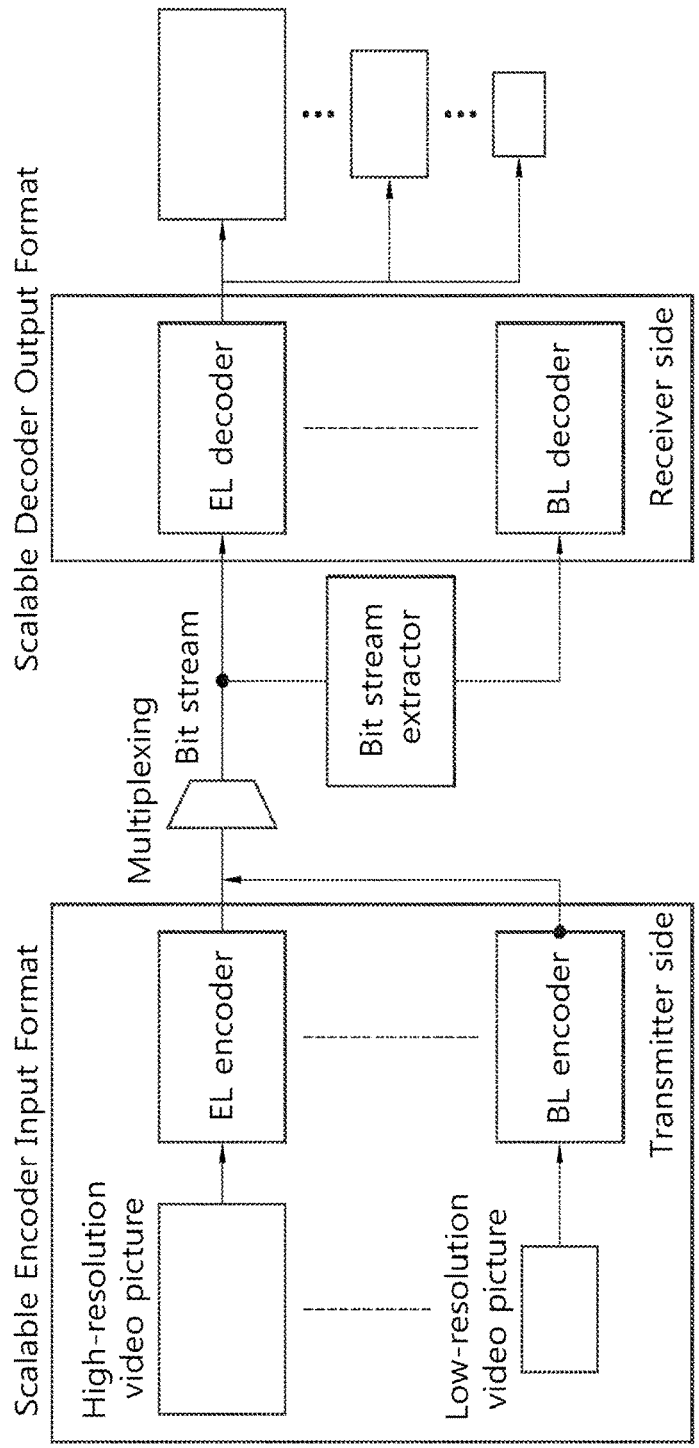
FIG. 1 illustrates a scalable video coding system.
Figure 2:
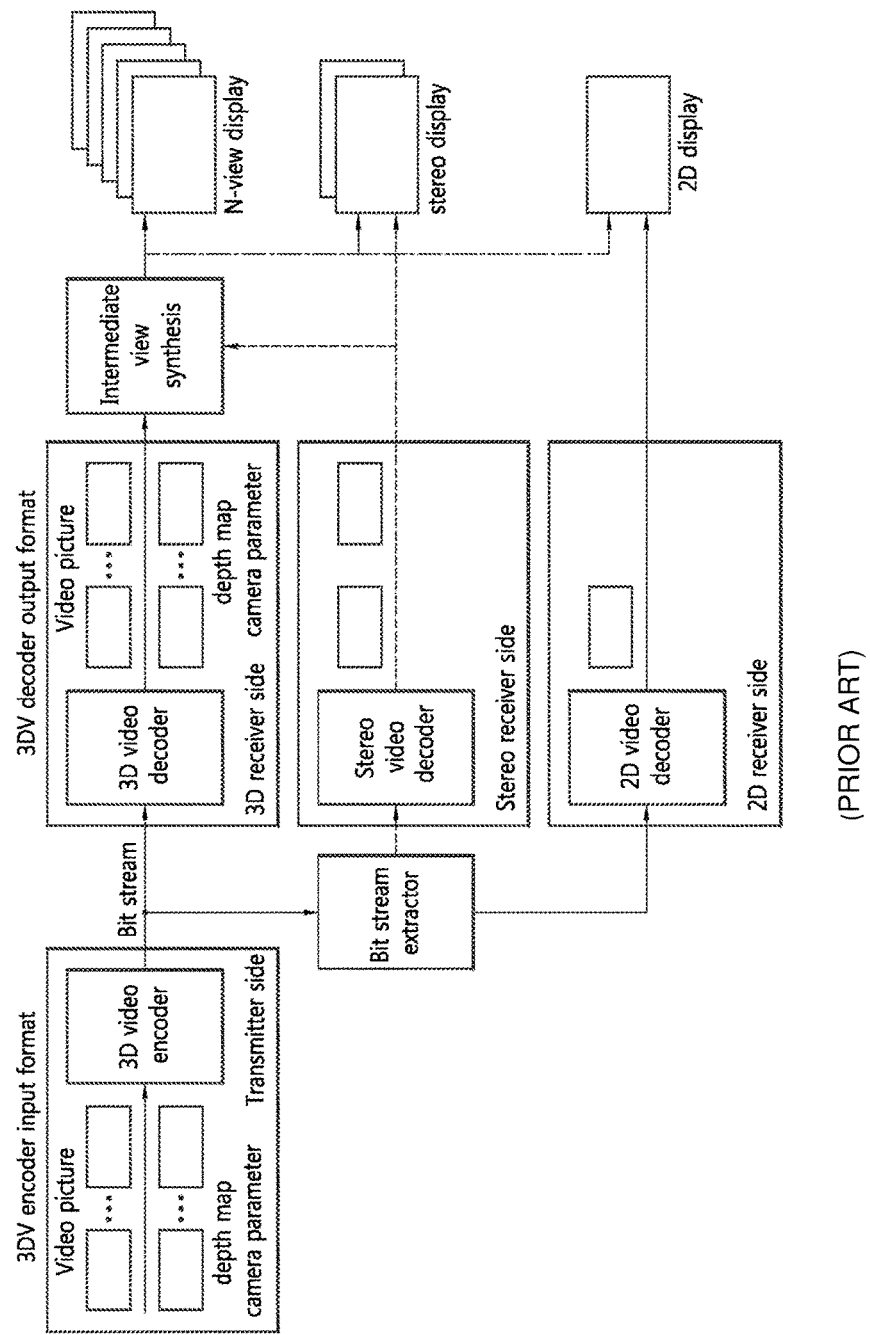
FIG. 2 illustrates a three-dimensional (3D) video system.
Figure 3:
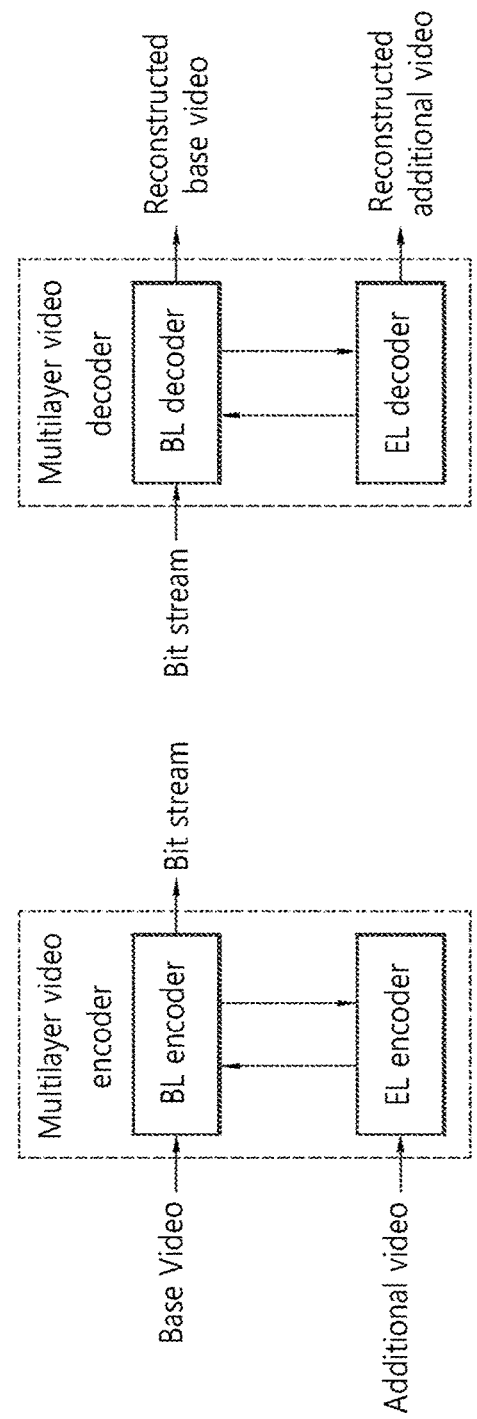
FIG. 3 illustrates an encoder/decoder supporting a multilayer video according to an embodiment.

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

It will be understood that when an element is referred to as being "connected" or "coupled" to another element, the element can be directly connected or coupled to another element or intervening elements. Also, when it is said that a specific element is "included," it may mean that elements other than the specific element are not excluded and that additional elements may be included in the embodiments of the present invention or the scope of the technical spirit of the present invention.

Although the terms "first," "second," etc. may be used to describe various elements, these elements should not be limited by these terms. These terms are used only to distinguish one element from another element. For example, a first element may be named a second element without departing from the scope of the present invention. Likewise, a second element may be named a first element.

Although components described in the embodiments of the present invention are independently illustrated in order to show different characteristic functions, such a configuration does not indicate that each component is constructed by a separate hardware constituent unit or software constituent unit. That is, each component includes individual components that are arranged for convenience of description, in which at least two components may be combined into a single component or a single component may be divided into a plurality of components to perform functions. It is to be noted that embodiments in which some components are integrated into one combined component and/or a component is divided into multiple separate components are included in the scope of the present invention without departing from the essence of the present invention.

Some constituent elements are not essential to perform the substantial functions in the invention and may be optional constituent elements for merely improving performance. The present invention may be embodied by including only constituent elements essential to implement the spirit of the invention other than constituent elements used for merely improving performance. A structure including only the essential constituent elements other than optional constituents used for merely improving performance also belongs to the scope of the present invention.

Multilayer pictures may include a base-layer ("BL") picture independently encoded/decoded and enhancement-layer ("EL") pictures encoded/decoded using picture information on the BL or another layer. The multilayer pictures may, for example, include a scalable video picture supporting scalability, multi-view video pictures supporting pictures from a plurality of viewpoints, and a stereoscopic three-dimensional (3D) video picture.

Conventional multilayer video encoding/decoding methods using information on correlations between a BL and an EL of a multilayer video employ interlayer correlations in order to increase coding efficiency, in which encoding/decoding algorithms are present for each layer. Accordingly, a greater number of encoding/decoding algorithms are needed when a multilayer video is encoded/decoded than when a BL is encoded/decoded, thus increasing computational complexity and implementation complexity of hardware and software to implement these algorithms.

Figure 4:
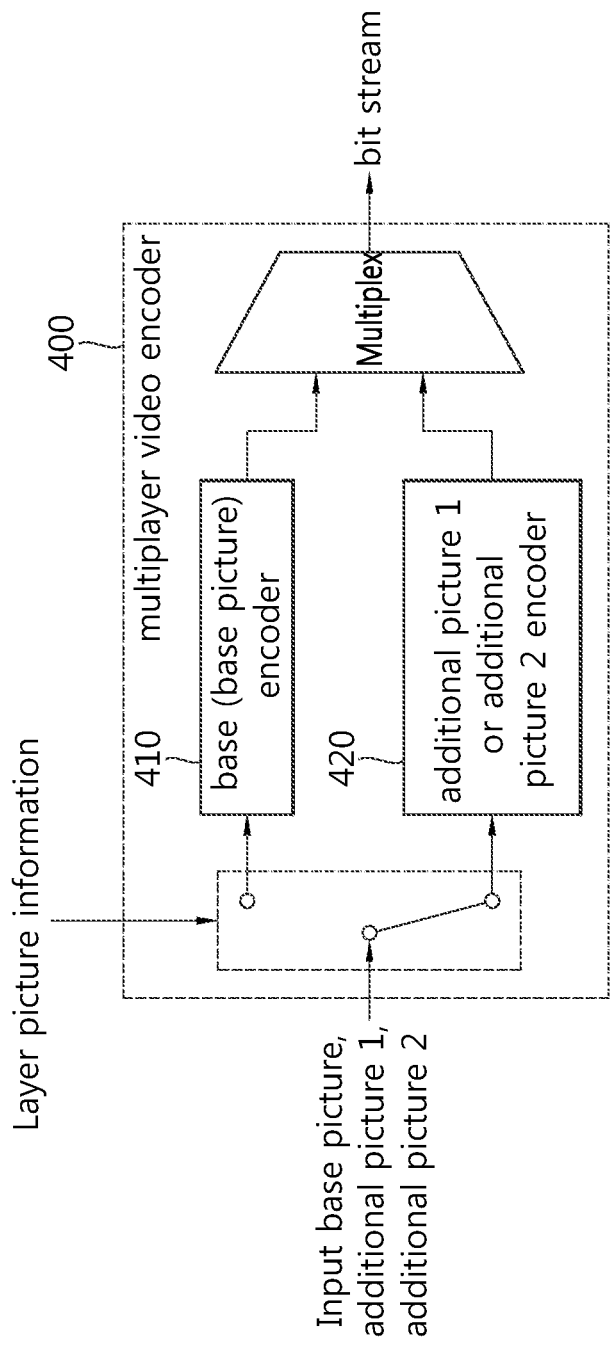
FIG. 4 illustrates a structure of a multilayer video encoder for encoding a multilayer video.

FIG. 4 illustrates a structure of a multilayer video encoder for encoding a multilayer video.

Referring to FIG. 4, the multilayer video encoder 400 receives inputs of pictures in different layers and encodes the pictures to output a single integrated bit stream.

For example, a picture in a BL as a base picture and pictures in an EL, that is, additional picture 1 and additional picture 2, may be input to the multilayer video encoder 400, in which these three pictures in the different layers may be input to and encoded by different encoders depending on picture information by layer, as shown in FIG. 4.

The base picture needs to be encoded by a conventional single picture layer video codec for backward compatibility and thus is encoded by a BL encoder 410. The additional pictures are encoded by the EL encoder 420 including an algorithm using an interlayer correlation. Thus, a more sophisticated encoder is needed when the additional pictures are encoded than when the base picture is encoded.

Figure 5:
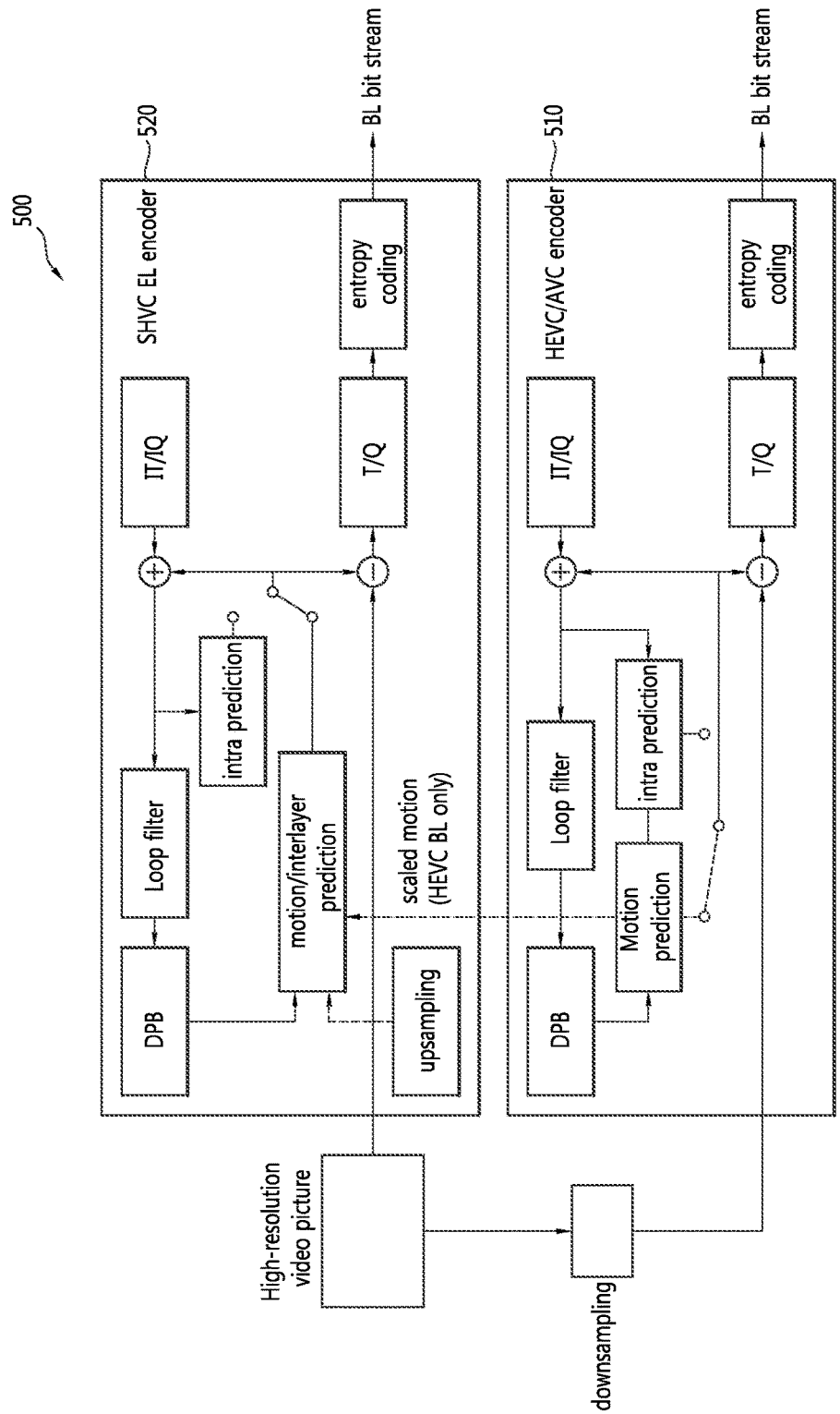
FIG. 5 illustrates a scalable high efficiency video coding (SHVC) encoder as a scalable video codec for encoding a scalable video picture according to an embodiment.

FIG. 5 illustrates a scalable high efficiency video coding (SHVC) encoder as a scalable video codec for encoding a scalable video according to an embodiment.

Referring to FIG. 5, the SHVC encoder 500 includes a BL encoder 510 to receive and encode a downsampled picture and the EL encoder 520 to receive and encode a high-resolution picture.

Among encoding algorithms used for the BL encoder 510 and the EL encoder 520, the same encoding algorithms for transformation and quantization (T/Q) or inverse transformation and dequantization (IT/IQ), intra prediction (Intra Pred.) and loop filtering (Loop Filter) may be used by each layer. However, since an encoding algorithm for motion prediction (M. C. Pred.) used for the EL encoder 520 further involves interlayer correlation information in addition to an encoding algorithm of the BL layer, the same algorithm for motion prediction as used for the BL layer may not be used.

Thus, an encoding algorithm module for the EL (except for the BL) may be realized by adding or modifying the information based on interlayer correlation information to part of a coding module of a BL encoding algorithm (hereinafter, "partial encoding module"). Thus, part of the module of the EL encoding algorithm is configured more complicated by adding an algorithm for the EL to the encoding algorithm module for the BL, and accordingly involves high computational complexity. Further, in view of implementation by hardware or software, the partial encoding module for the BL and the partial encoding module for the EL need to be implemented independently of each other, and thus hardware and software implementation complexity also increases substantially.

Figure 6:
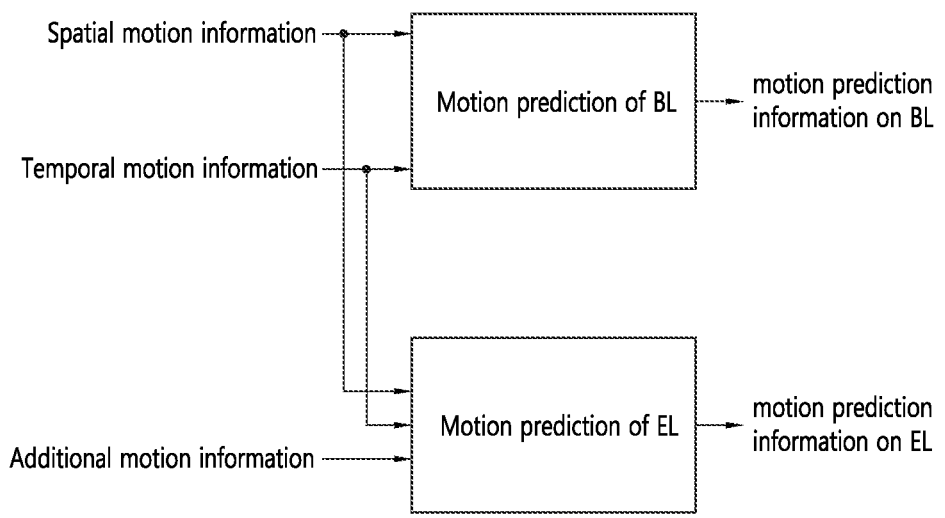
FIG. 6 illustrates a motion prediction method between a base layer and an enhancement layer configured as hardware according to an embodiment.

FIG. 6 illustrates a motion prediction method between a BL and an EL configured as hardware according to an embodiment.

Referring to FIG. 6, a motion prediction method for a general picture of the BL and a motion prediction method for the EL have the same input parameters. A difference is that an "additional motion information" parameter based on the BL or interlayer correlation information is added for the EL as an input parameter of the motion prediction method for the EL. Further, in the motion prediction method for the EL, a motion prediction method part is changed by the additional motion information. That is, to include the additional motion information in the motion prediction method for the EL (that is, to increase encoding efficiency), all motion prediction modules for the EL need to be configured newly. This may cause an increase in hardware implementation complexity.

In the motion prediction method illustrated in FIG. 6, an SHVC video codec may encode an EL picture using motion prediction information from the BL or scaled information thereof as additional motion information. A 3D-HEVC video codec may encode an EL picture using inter-viewpoint motion prediction information obtained from a reference viewpoint picture, an additional viewpoint picture and depth maps thereof as additional motion information.

Thus, when the same encoding method is used for the BL, an encoding method for the EL is distinguished merely by additional interlayer correlation information obtained according to an interlayer video coding method. Different video codices using the same BL encoding method but different EL encoding methods need to configure new encoding modules separately for the BL and the EL using different hardware resources.

For example, the 3D-HEVC as an international standard being developed by a joint standardization group JCT-3V needs to employ an HEVC (or H.265) video codec for the BL and a video codec with an algorithm for the EL additionally extended (hereinafter "3D enhanced HEVC codec") determined by 3D-HEVC international standard for the EL.

Also, SHVC as an international standard being developed by JCT-VC needs to employ an HEVC (or H.265) video codec for the BL and a video codec with an algorithm for the EL additionally extended (hereinafter "scalable enhanced HEVC codec") determined by SHVC international standard for the EL.

In order to configure and provide a combined codec including the 3D-HEVC codec for 3D video and the SHVC codec for scalable video along with the HEVC codec to users, all of the HEVC codec, the 3D enhanced HEVC codec and the scalable enhanced HEVC codec need to be configured in a single integrated codec. In the integrated codec, as the HEVC codec for the BL needs to be configured in duplicate in the 3D enhanced HEVC codec and the scalable enhanced HEVC codec, three HEVC codec related algorithms need to be redundantly configured and installed in total to complete the integrated codec. This integrated codec, as shown in FIG. 7, causes huge implementation complexity in designing hardware and software and configuration redundancy of a base codec (in FIG. 7, three HEVC codices are basically necessary).

Thus, the present invention provides a method of realizing different video codices having the same BL encoding algorithm into a single integrated video codec.

Figure 7:
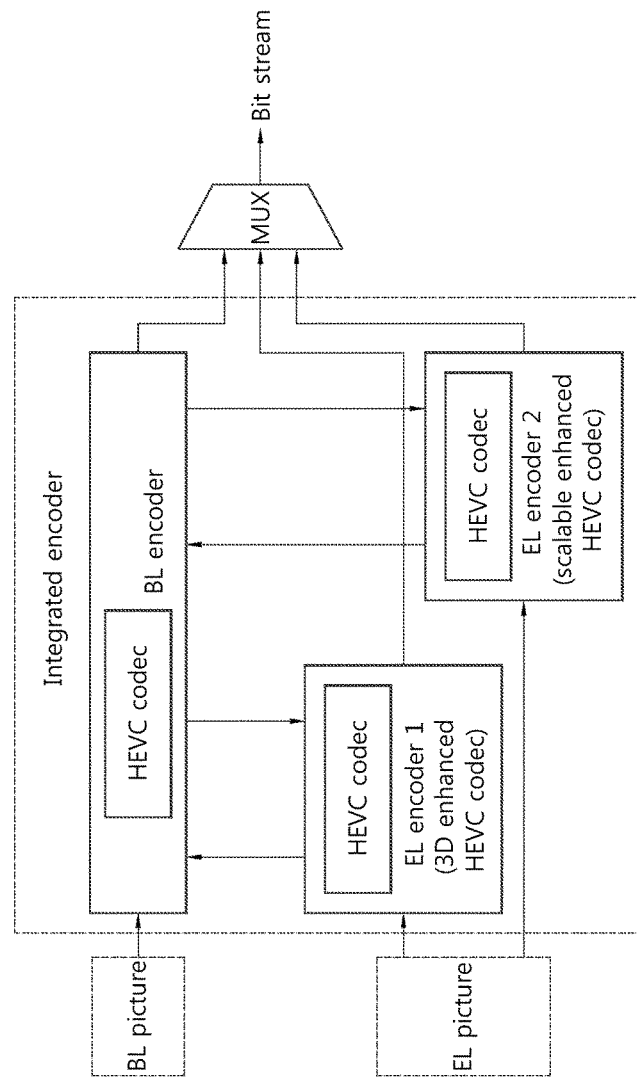
FIG. 7 illustrates that HEVC, SHVC and 3D-HEVC codices are combined as a combined codec according to an embodiment.

Hereinafter, the present invention provides a method for reducing implementation complexity in designing hardware and software and removing configuration redundancy of a base codec when the HEVC codec, the 3D-HEVC codec and the SHVC codec are combined into a single integrated codec as shown in FIG. 7.

The present invention is ultimately aimed at realizing single integrated hardware by different video codices which have the same BL encoding/decoding algorithm reusing the same BL encoding/decoding module configured as a hardware chip and just applying an additional encoding/decoding algorithm depending on a video codec type in configuring each EL encoding/decoding module.

Embodiment 1

Figure 8:
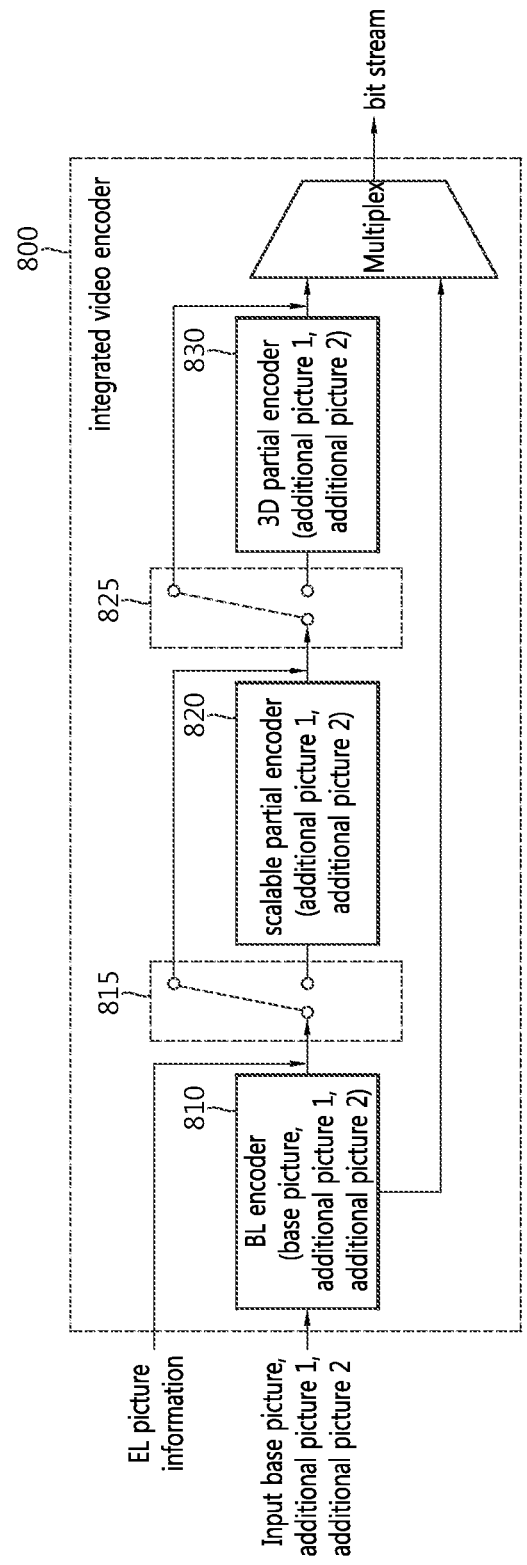
FIG. 8 illustrates an integrated video encoder according to an embodiment of the present invention.

FIG. 8 illustrates an integrated video encoder according to an embodiment of the present invention.

The integrated video encoder according to the present embodiment may encode multilayer pictures with different types. For example, the integrated video encoder may encode different multilayer pictures, such as scalable pictures supporting at least one of view, temporal, spatial and quality scalabilities and 3D video pictures including general pictures by viewpoint ("general viewpoint picture") and depth map pictures thereof.

Referring to FIG. 8, the integrated video encoder 800 may encode input pictures in different layers and output a single integrated bit stream.

For example, the integrated video encoder 800 may receive inputs of general viewpoint pictures and depth map pictures thereof, if related to a 3D video codec, or receive inputs of pictures by layers ("layer pictures") including at least one of temporal, spatial and quality (signal-to-noise ratio (SNR)) scalability information, if related to a scalable video codec, and encode the layer pictures using a BL encoder 810. For example, MPEG-1, MPEG-2, MPEG-4 Part 2 Visual, H.264/AVC, VC-1, AVS, KTA and HEVC (H.265/HEVC) may be used as an encoder.

The BL encoder 810 includes an encoding algorithm module for encoding a BL picture among the input multilayer pictures. For example, the BL encoder 810 may include encoding algorithm modules for transformation, quantization, inverse transformation, dequantization, intra prediction, motion prediction and loop filtering and be configured as an encoding algorithm module commonly applicable to not only a BL picture but an EL picture.

The integrated video encoder 800 may encode additional pictures by additionally operating partial encoders 820 and 830 in order to increase encoding efficiency.

The partial encoders 820 and 830 include an additional encoding algorithm module for encoding the EL pictures according to the video coding type of the multilayer pictures. For instance, the partial encoders 820 and 830 may include a scalable partial encoder 820 including an additional encoding algorithm module for encoding the EL with respect to a scalable picture and a 3D partial encoder 830 including an additional encoding algorithm module for encoding the EL with respect to a 3D video picture.

Here, the scalable partial encoder 820 and the 3D partial encoder 830 may be realized as an algorithm which is not encoded using the base encoding algorithm module, that is, an encoding algorithm module using interlayer correlation information. For example, the scalable partial encoder 820 and the 3D partial encoder 830 may include an interlayer prediction module which conducts prediction using interlayer information in motion prediction.

The integrated video encoder 800 may determine whether to employ the scalable partial encoder 820 or employ the 3D partial encoder 830 based on EL picture information specifying a video coding type of the multilayer pictures.

If the EL picture information indicates that scalable video coding is carried out, the integrated video encoder 800 may operate a switch 815 to apply the scalable partial encoder 820. However, if the EL picture information indicates that 3D video coding is carried out, the integrated video encoder 800 may operate the switch 815 not to apply the scalable partial encoder 820 and operate a switch 825 to apply the 3D partial encoder 830.

The integrated video encoder 800 may multiplex bit streams of the layer pictures encoded by the BL encoder 810 and the partial encoders 820 and 830 into a single bit stream, and include a multiplexer for multiplexing.

The integrated video encoder 800 according to the present embodiment apply the same module as used for encoding the base picture (BL picture) providing backward compatibility to encoding the additional picture (EL picture) to decrease implementation complexity, and determine and additionally apply the partial encoder to be applied to the additional picture with respect to the EL based on the EL picture information to improve encoding efficiency.

Figure 9:
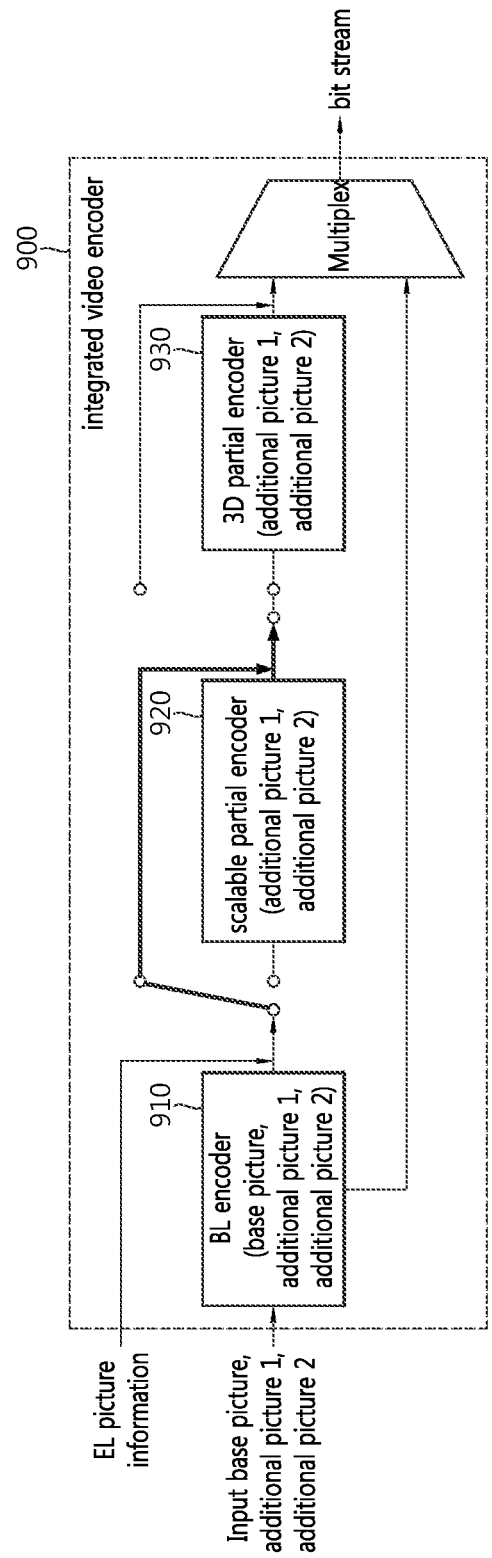
FIG. 9 illustrates a method of conducting 3D video coding using the integrated video encoder of FIG. 8 according to an embodiment of the present invention.

FIG. 9 illustrates a method of conducting 3D video coding using the integrated video encoder of FIG. 8 according to an embodiment of the present invention.

FIG. 9 describes a process of conducting 3D video coding by the integrated video encoder when general pictures and depth map pictures from each viewpoint are input as multilayer pictures.

Referring to FIG. 9, the integrated video encoder 900 may operate the BL encoder 910 with respect to the input 3D video picture, and not operate the scalable partial encoder 920 and operate the 3D partial encoder 930, based on input EL picture information (information indicating that 3D video coding is conducted), with respect to the EL 3D video picture.

The 3D video picture encoded by the BL encoder 910 and the 3D video picture with respect to an EL encoded by the 3D partial encoder 930 are input to a multiplexing module and multiplexed by the multiplexing module to output a bit stream.

Figure 10:
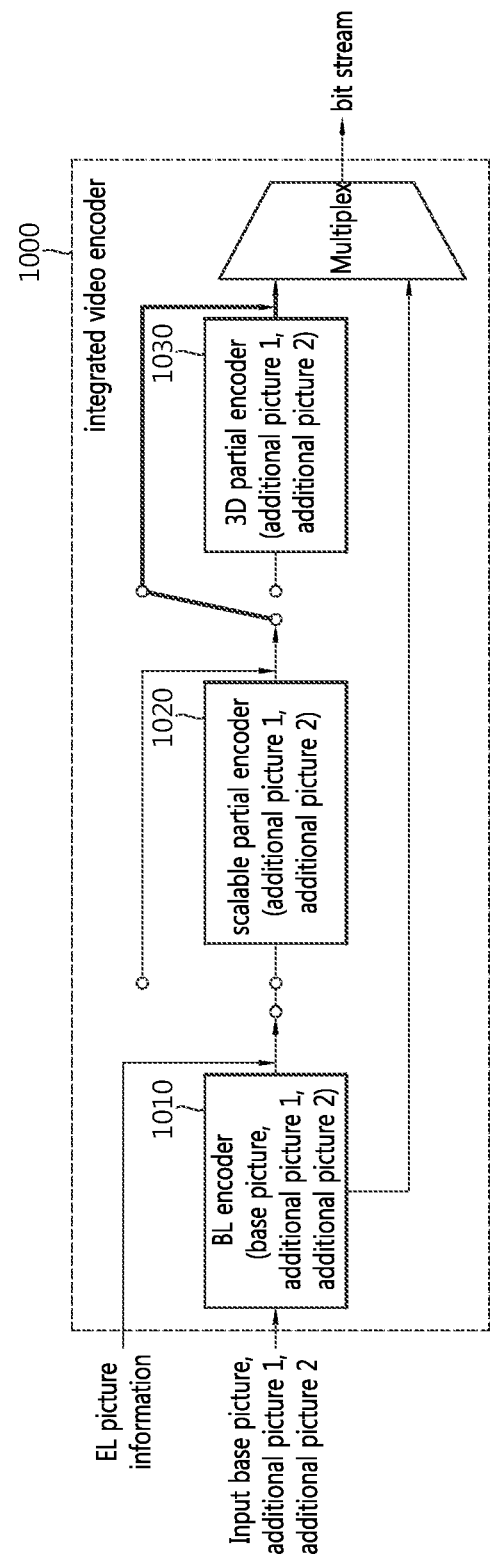
FIG. 10 illustrates a method of conducting scalable video coding using the integrated video encoder of FIG. 8 according to an embodiment of the present invention.

FIG. 10 illustrates a method of conducting scalable video coding using the integrated video encoder of FIG. 8 according to an embodiment of the present invention.

FIG. 10 describes a process of conducting scalable video coding by the integrated video encoder when the scalable picture including at least one of view, temporal, spatial and quality scalabilities is input as a multilayer picture.

Referring to FIG. 10, the integrated video encoder 1000 may operate the BL encoder 1010 with respect to the input scalable picture, and operate the scalable partial encoder 1020, based on input EL picture information (information indicating that scalable video coding is conducted), with respect to the EL scalable picture. Here, the integrated video encoder 1000 may not operate the 3D partial encoder 1030.

The scalable picture encoded by the BL encoder 1010 and the EL scalable picture with respect to an EL encoded by the scalable partial encoder 1020 are input to a multiplexing module and multiplexed by the multiplexing module to output a bit stream.

Embodiment 2

Figure 11:
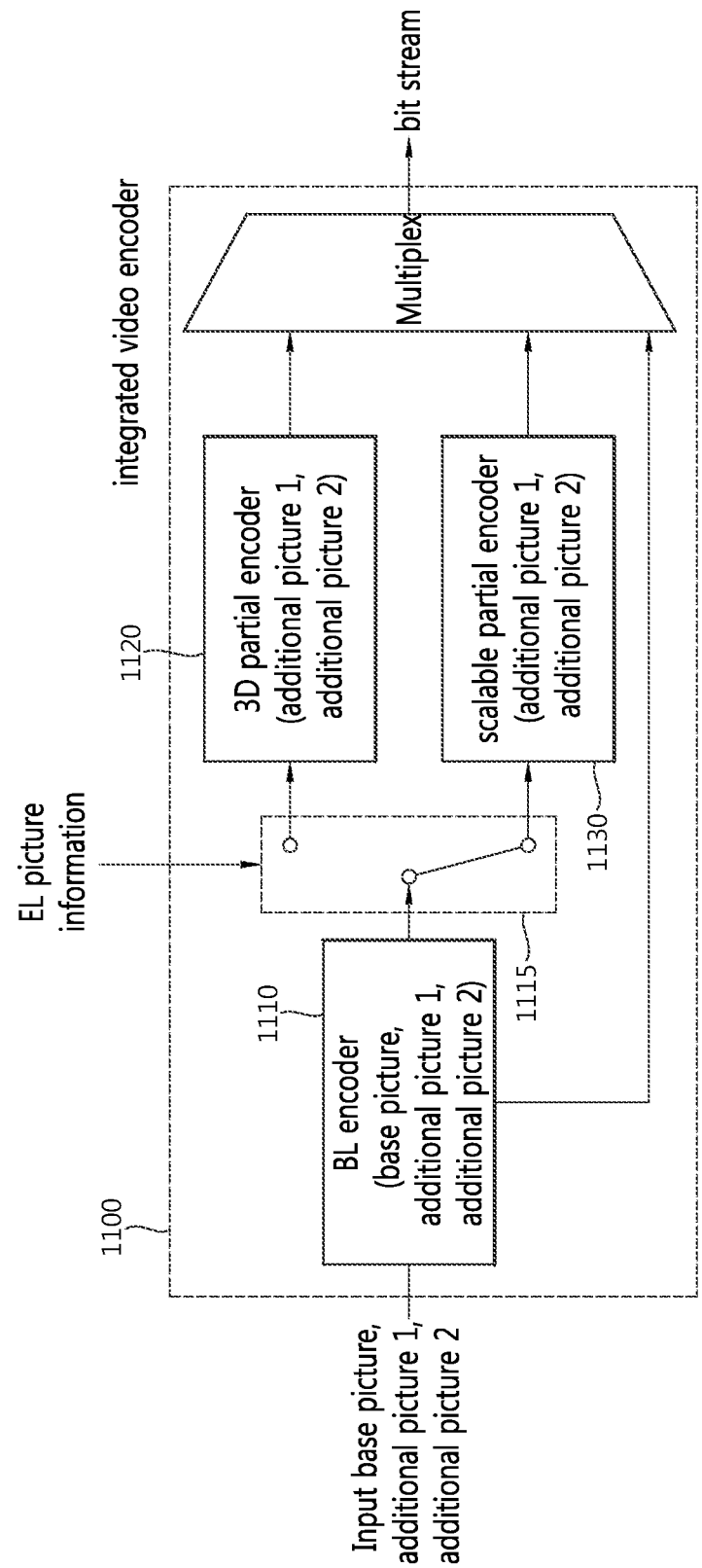
FIG. 11 illustrates an integrated video encoder according to another embodiment of the present invention.

FIG. 11 illustrates an integrated video encoder according to another embodiment of the present invention.

The integrated video encoder according to the present embodiment may encode multilayer pictures with different types. For example, the integrated video encoder may encode different multilayer pictures, such as a scalable picture supporting at least one of view, temporal, spatial and quality scalabilities and a 3D video picture including general viewpoint pictures and depth map pictures from each viewpoint.

Referring to FIG. 11, the integrated video encoder 1100 may encode input pictures in different layers and output a single integrated bit stream.

For example, the integrated video encoder 1100 may receive inputs of general viewpoint pictures and depth map pictures from each viewpoint, if related to a 3D video codec, or receive inputs of layer pictures including temporal, spatial or quality (SNR) scalability information, if related to a scalable video codec, and encode the layer pictures using a BL encoder 1110. For example, MPEG-1, MPEG-2, MPEG-4 Part 2 Visual, H.264/AVC, VC-1, AVS, KTA and HEVC (H.265/HEVC) may be used as an encoder.

The BL encoder 1110 includes an encoding algorithm module for encoding the BL picture among the input multilayer pictures. For example, the BL encoder 1110 may include encoding algorithm modules for transformation, quantization, inverse transformation, dequantization, intra prediction, motion prediction and loop filtering and be configured as an encoding algorithm module commonly applicable to not only the BL picture but the EL picture.

The integrated video encoder 1100 may encode additional pictures by additionally operating partial encoders 1120 and 1130 in order to increase encoding efficiency.

The partial encoders 1120 and 1130 include an additional encoding algorithm module for encoding the EL picture according to the video coding type of the multilayer pictures. For instance, the partial encoders 1120 and 1130 may include a 3D partial encoder 1120 including an additional encoding algorithm module for encoding the EL with respect to a 3D video picture and a scalable partial encoder 1130 including an additional encoding algorithm module for encoding the EL with respect to a scalable picture.

Here, the 3D partial encoder 1120 and the scalable partial encoder 1130 may be realized as an algorithm which is not encoded using the base encoding algorithm module used for encoding the BL picture, that is, an encoding algorithm module using interlayer correlation information. For example, the 3D partial encoder 1120 and the scalable partial encoder 1130 may include an interlayer prediction module which conducts prediction using interlayer information in motion prediction.

The integrated video encoder 1100 may determine whether to employ the 3D partial encoder 1120 or employ the scalable partial encoder 1130 based on EL picture information specifying a video coding type of the multilayer pictures.

If the EL picture information indicates that 3D video coding is carried out, the integrated video encoder 1100 may operate a switch 1115 to apply the 3D partial encoder 1120. However, if the EL picture information indicates that scalable video coding is carried out, the integrated video encoder 1100 may operate the switch 1115 to apply the scalable partial encoder 1130.

The integrated video encoder 1100 may multiplex bit streams of the layer pictures encoded by the BL encoder 1110 and the partial encoders 1120 and 1130 into a single bit stream, and include a multiplexer for multiplexing.

The integrated video encoder 1100 according to the present embodiment apply the same module as used for encoding the base picture (BL picture) providing backward compatibility to encoding the additional picture (EL picture) to decrease implementation complexity, and determine and additionally apply a partial encoder to be applied to the additional picture with respect to the EL based on the EL picture information to improve encoding efficiency.

Figure 12:
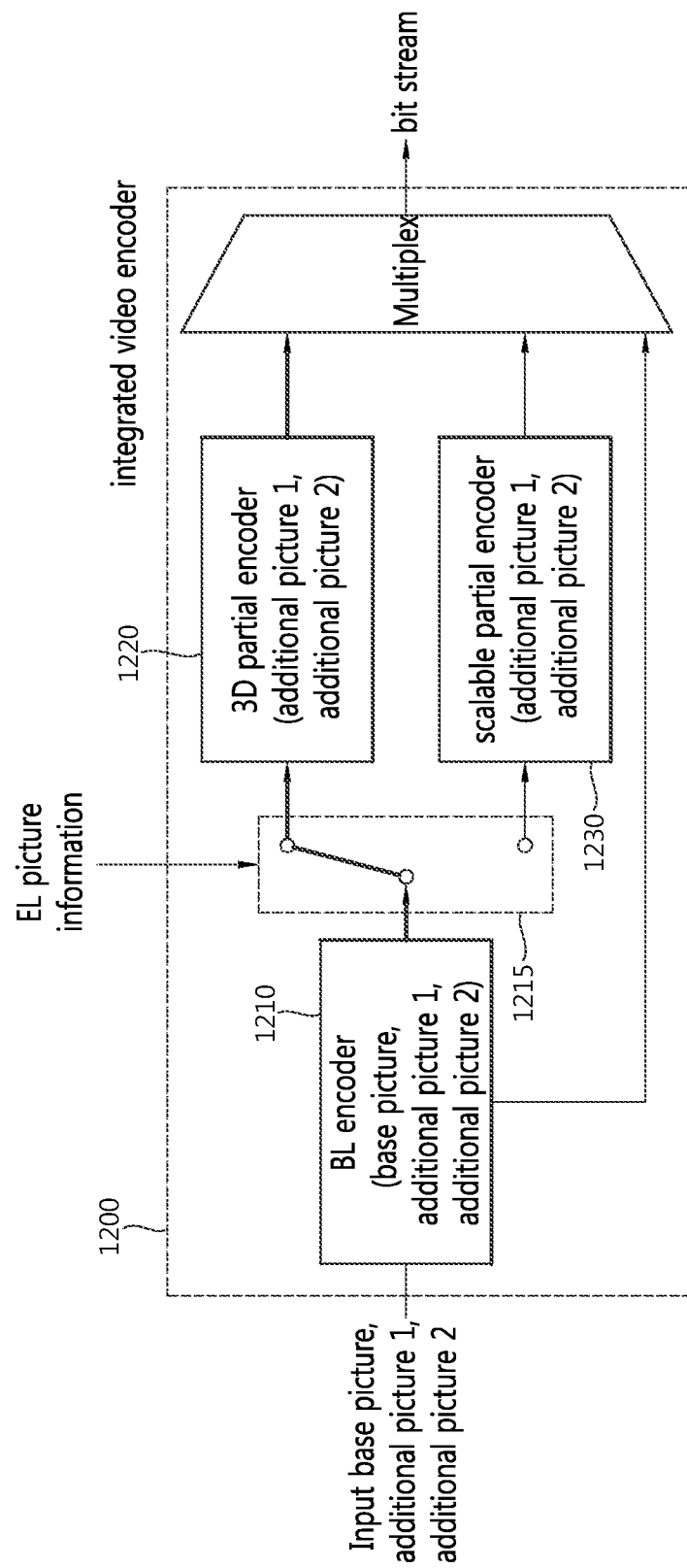
FIG. 12 illustrates a method of conducting 3D video coding using the integrated video encoder of FIG. 11 according to an embodiment of the present invention.

FIG. 12 illustrates a method of conducting 3D video coding using the integrated video encoder of FIG. 11 according to an embodiment of the present invention.

FIG. 12 describes a process of conducting 3D video coding by the integrated video encoder when general viewpoint pictures and depth map pictures from each viewpoint are input as multilayer pictures.

Referring to FIG. 12, the integrated video encoder 1200 may operate the BL encoder 1210 with respect to an input 3D video picture, and operate the 3D partial encoder 1220, based on input EL picture information (information indicating that 3D video coding is conducted), with respect to an EL 3D video picture.

The 3D video picture encoded by the BL encoder 1210 and the 3D video picture with respect to an EL encoded by the 3D partial encoder 1220 are input to a multiplexing module and multiplexed by the multiplexing module to output a bit stream.

Figure 13:
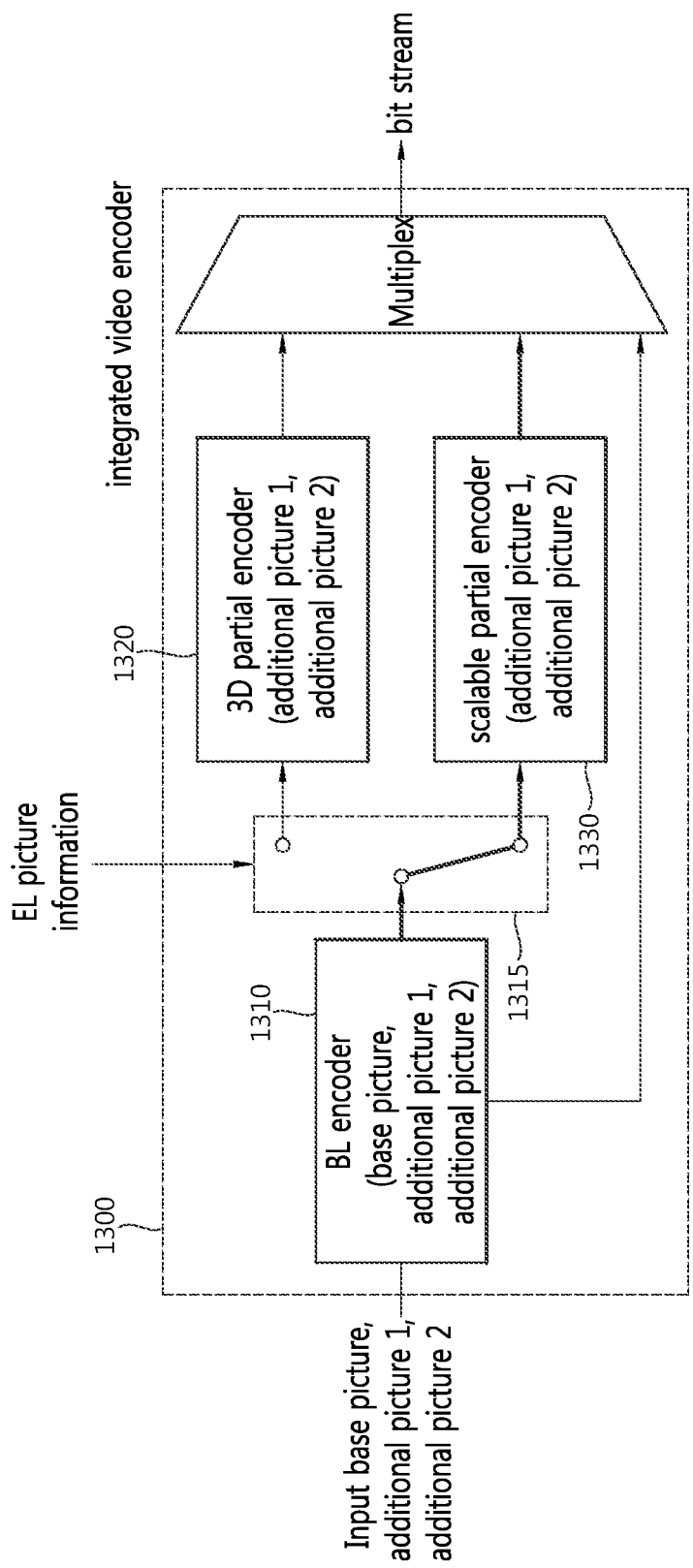
FIG. 13 illustrates a method of conducting scalable video coding using the integrated video encoder of FIG. 11 according to an embodiment of the present invention.

FIG. 13 illustrates a method of conducting scalable video coding using the integrated video encoder of FIG. 11 according to an embodiment of the present invention.

FIG. 13 describes a process of conducting scalable video coding by the integrated video encoder when a scalable picture including at least one of view, temporal, spatial and quality scalabilities is input as a multilayer picture.

Referring to FIG. 13, the integrated video encoder 1300 may operate the BL encoder 1310 with respect to the input scalable picture, and operate the scalable partial encoder 1330, based on input EL picture information (information indicating that scalable video coding is conducted), with respect to the EL scalable picture.

The scalable picture encoded by the BL encoder 1310 and the scalable picture with respect to an EL encoded by the scalable partial encoder 1320 are input to a multiplexing module and multiplexed by the multiplexing module to output a bit stream.

Figure 14:
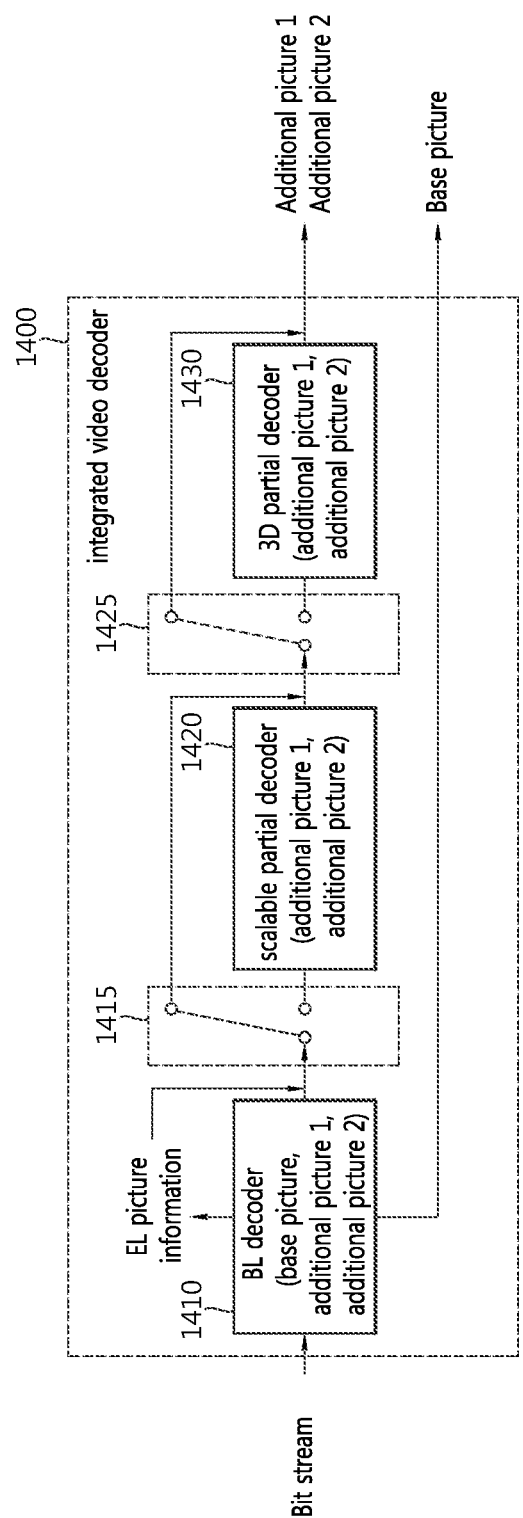
FIG. 14 illustrates an integrated video decoder according to an embodiment of the present invention.
Figure 15:
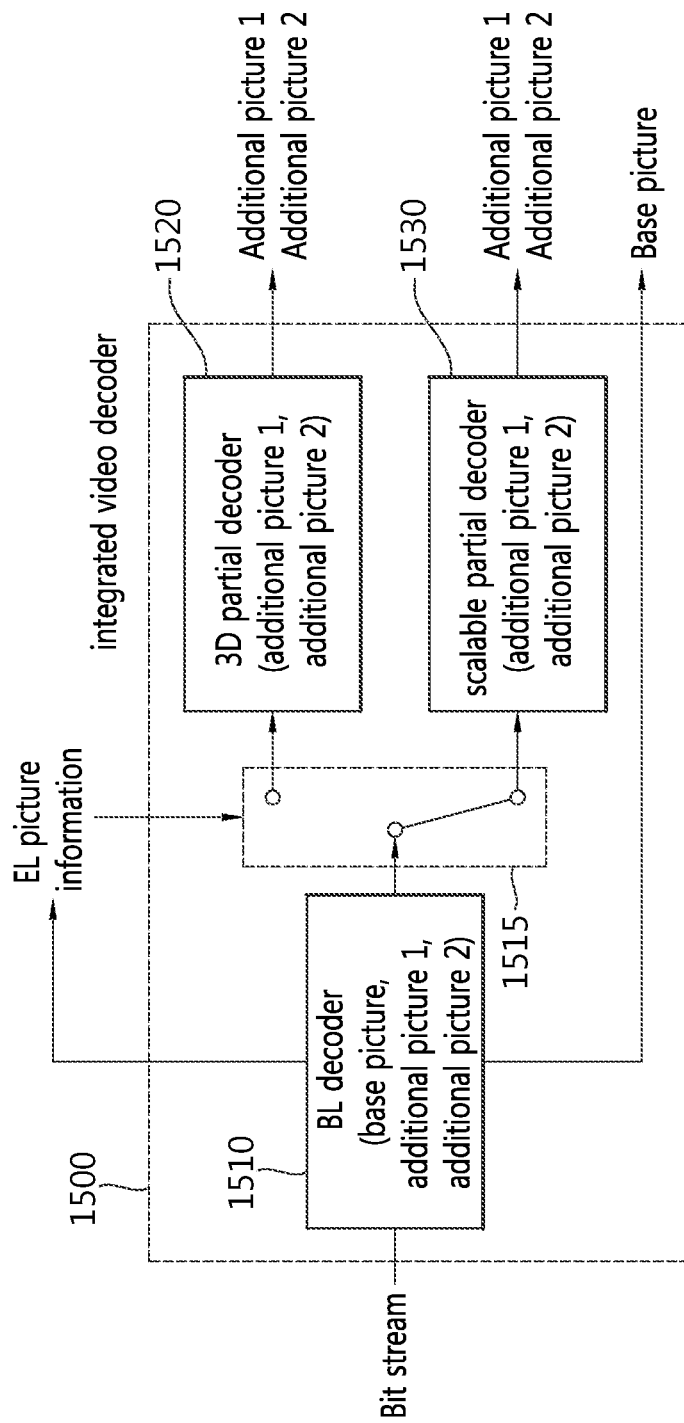
FIG. 15 illustrates an integrated video decoder according to another embodiment of the present invention.

The encoding methods performed by the integrated video encoders illustrated with reference to FIGS. 8 to 13 may be applicable to a decoding method, and FIGS. 14 and 15 illustrate an integrated video decoder supporting different multilayer pictures.

FIG. 14 illustrates an integrated video decoder according to an embodiment of the present invention.

The integrated video decoder according to the present embodiment may decode multilayer pictures with different types. For example, the integrated video decoder may decode different multilayer pictures, such as a scalable picture supporting at least one of view, temporal, spatial and quality scalabilities and a 3D video picture including general viewpoint pictures and depth map pictures from each viewpoint.

Referring to FIG. 14, the integrated video decoder 1400 employs a BL decoder 1410, and employs a scalable partial decoder 1420 or 3D partial decoder 1430 based on EL picture information obtained in the BL decoder, thereby decoding an input bit stream.

The BL decoder 1410 includes a decoding algorithm module for decoding the BL picture with respect to the input bit stream. For example, the BL encoder 1410 may include decoding algorithm modules for transformation, quantization, inverse transformation, dequantization, intra prediction, motion prediction and loop filtering and be configured as a decoding algorithm module commonly applicable to not only the BL picture but the EL picture.

The BL picture may be reconstructed by the BL decoder 1410.

The partial decoders 1420 and 1430 include an additional decoding algorithm module for decoding the EL picture according to the video coding type of the multilayer pictures. For instance, the partial decoders 1420 and 1430 may include a scalable partial decoder 1420 including an additional decoding algorithm module for decoding the EL with respect to a scalable picture and a 3D partial decoder 1430 including an additional decoding algorithm module for decoding the EL with respect to a 3D video picture.

Here, the scalable partial decoder 1420 and the 3D partial decoder 1430 may be realized as an algorithm which is not decoded using a base decoding algorithm module used for decoding the BL picture, that is, a decoding algorithm module using interlayer correlation information. For example, the scalable partial decoder 1420 and the 3D partial decoder 1430 may include an interlayer prediction module which conducts prediction using interlayer information in motion prediction.

The integrated video decoder 1400 may determine whether to employ the scalable partial decoder 1420 or employ the 3D partial decoder 1430 based on the EL picture information specifying the video coding type of the multilayer pictures.

If the input bit stream is generated by encoding by the scalable partial encoder of FIG. 8, the integrated video decoder 1400 may obtain EL picture information indicating that scalable video coding needs to be conducted through the BL decoder 1410 and operate a switch 1415 to perform the scalable partial decoder 1420, thereby decoding the EL picture.

Meanwhile, if the input bit stream is generated by encoding by the 3D partial encoder of FIG. 8, the integrated video decoder 1400 may obtain EL picture information indicating that 3D video coding needs to be conducted through the BL decoder 1410 and operate a switch 1425 to perform the 3D partial decoder 1430, thereby decoding the EL picture.

FIG. 15 illustrates an integrated video decoder according to another embodiment of the present invention.

The integrated video decoder according to the present embodiment may decode multilayer pictures with different types. For example, the integrated video decoder may decode different multilayer pictures, such as a scalable picture supporting at least one of view, temporal, spatial and quality scalabilities and a 3D video picture including general viewpoint pictures and depth map pictures from each viewpoint.

Referring to FIG. 15, the integrated video decoder 1500 employs a BL decoder 1510, and employs a 3D partial decoder 1520 or scalable partial decoder 1530 based on EL picture information obtained in the BL decoder, thereby decoding an input bit stream.

The BL decoder 1510 includes a decoding algorithm module for decoding a BL picture with respect to the input bit stream. For example, the BL encoder 1510 may include decoding algorithm modules for transformation, quantization, inverse transformation, dequantization, intra prediction, motion prediction and loop filtering and be configured as a decoding algorithm module commonly applicable to not only the BL picture but the EL picture.

The BL picture may be reconstructed by the BL decoder 1510.

The partial decoders 1520 and 1530 include an additional decoding algorithm module for decoding the EL picture according to the video coding type of the multilayer pictures. For instance, the partial decoders 1520 and 1530 may include a 3D partial encoder 1520 including an additional decoding algorithm module for decoding the EL with respect to a 3D video picture and a scalable partial encoder 1530 including an additional decoding algorithm module for decoding the EL with respect to a scalable picture.

Here, the 3D partial decoder 1520 and the scalable partial decoder 1530 may be realized as an algorithm which is not decoded using a base decoding algorithm module used for decoding the BL picture, that is, a decoding algorithm module using interlayer correlation information. For example, the 3D partial decoder 1520 and the scalable partial decoder 1530 may include an interlayer prediction module which conducts prediction using interlayer information in motion prediction.

The integrated video decoder 1500 may determine whether to employ the 3D partial decoder 1520 or employ the scalable partial decoder 1530 based on the EL picture information specifying the video coding type of the multilayer pictures.

If the input bit stream is generated by encoding by the 3D partial encoder of FIG. 11, the integrated video decoder 1500 may obtain the EL picture information indicating that 3D video coding needs to be conducted through the BL decoder 1510 and operate a switch 1515 to perform the 3D partial decoder 1520, thereby decoding the EL picture.

Meanwhile, if the input bit stream is generated by encoding by the scalable partial encoder of FIG. 11, the integrated video decoder 1500 may obtain the EL picture information indicating that scalable video coding needs to be conducted through the BL decoder 1510 and operate the switch 1515 to perform the scalable partial decoder 1530, thereby decoding the EL picture.

Although the methods have been described with a series of stages or blocks based on the flowcharts in the aforementioned embodiments, the present invention is not limited to the foregoing sequence of the stages. Some stages may be carried out in different order from described above or at the same time. Also, it will be understood by those skilled in the art that the stages illustrated in the flowcharts are not exclusive, additional stages may be included in the flowchart, or one or more stages may be deleted from the flowcharts without affecting the scope of the present invention.

While a few exemplary embodiments have been shown and described with reference to the accompanying drawings, it will be apparent to those skilled in the art that various modifications and variations can be made from the foregoing descriptions without departing from the essence of the present invention. The exemplary embodiments are provided not to restrict the concept of the present invention but to illustrate the present invention and do not limit the scope of the present invention. The scope of the invention is defined by the appended claims, and all differences within the scope will be construed as being included within the appended claims of the present invention.

The invention claimed is:

1. An integrated video encoder supporting multilayer pictures with different types, the integrated video encoder comprising one or more hardware chips, the one or more hardware chips functioning as:
    a base encoder encoding both a base-layer picture and an enhancement-layer picture among multilayer pictures; and
    a partial encoder encoding, based on interlayer correlation information and enhancement-layer picture information, the enhancement-layer picture other than the base-layer picture among the multiplayer pictures, a type of the partial encoder being selected by the enhancement-layer picture information specifying a video coding type of the multilayer pictures,
    wherein the multilayer pictures comprise a scalable picture supporting at least one of view, temporal or quality scalabilities or a three-dimensional (3D) video picture comprising general pictures and depth map pictures from each viewpoint.

2. The integrated video encoder of claim 1, wherein the partial encoder comprises a scalable partial encoder encoding an enhancement layer with respect to the scalable picture; and a 3D partial encoder encoding an enhancement layer with respect to the 3D video picture.

3. The integrated video encoder of claim 1, wherein the base encoder performs at least one of transformation, quantization, inverse transformation, dequantization, intra prediction, motion prediction or loop filtering to both of the base-layer picture and the enhancement-layer picture.

4. The integrated video encoder of claim 1, wherein the partial encoder performs an additional encoding to the enhancement-layer picture using the interlayer correlation information.

5. The integrated video encoder of claim 1, wherein the one or more hardware chips are further implemented as a multiplexer to multiplex a bit-stream of the base-layer picture encoded by the base encoder and bit-streams of the enhancement-layer pictures encoded by the base encoder and the partial encoder.

6. An integrated video decoder supporting multilayer pictures with different types, the integrated video decoder comprising one or more hardware chips, the one or more hardware chips function as:
- a base decoder decoding both a base-layer picture and an enhancement-layer picture among multilayer pictures; and
- a partial decoder decoding, based on interlayer correlation information and enhancement-layer picture information, the enhancement-layer picture other than the base-layer picture among the multilayer pictures, a type of the partial decoder being selected by the enhancement-layer picture information specifying a video coding type of the multilayer pictures, wherein the multilayer pictures comprise a scalable picture supporting at least one of view, temporal or quality scalabilities or a three-dimensional (3D) video picture comprising general pictures and depth map pictures from each viewpoint.

7. The integrated video decoder of claim 6, wherein the partial decoder comprises a scalable partial decoder decoding an enhancement layer with respect to the scalable picture; and a 3D partial decoder decoding an enhancement layer with respect to the 3D video picture.

8. The integrated video decoder of claim 6, wherein the base decoder performs at least one of transformation, quantization, inverse transformation, dequantization, intra prediction, motion prediction or loop filtering to both of the base-layer picture and the enhancement-layer picture.

9. The integrated video decoder of claim 6, wherein the partial decoder performs an additional decoding to the enhancement-layer picture using the interlayer correlation information.

* * * * *